US012445592B1

United States Patent
Fattal et al.

(10) Patent No.: US 12,445,592 B1
(45) Date of Patent: Oct. 14, 2025

(54) PREDICTIVE HEAD-TRACKING MULTIVIEW DISPLAY AND METHOD

(71) Applicant: LEIA Inc., Menlo Park, CA (US)

(72) Inventors: David A. Fattal, Mountain View, CA (US); George Shakula, Kyiv (UA)

(73) Assignee: LEIA Inc., Menlo Park, CA (US)

( * ) Notice: Subject to any disclaimer, the term of this patent is extended or adjusted under 35 U.S.C. 154(b) by 0 days.

(21) Appl. No.: 18/864,447

(22) PCT Filed: May 6, 2023

(86) PCT No.: PCT/US2023/021275
§ 371 (c)(1),
(2) Date: Nov. 8, 2024

(87) PCT Pub. No.: WO2023/219916
PCT Pub. Date: Nov. 16, 2023

Related U.S. Application Data

(60) Provisional application No. 63/340,369, filed on May 10, 2022.

(51) Int. Cl.
*H04N 13/00* (2018.01)
*G09G 3/00* (2006.01)
(Continued)

(52) U.S. Cl.
CPC ........... *H04N 13/366* (2018.05); *G09G 3/007* (2013.01); *G09G 3/025* (2013.01); *G09G 3/3426* (2013.01);
(Continued)

(58) Field of Classification Search
CPC .... H04N 13/366; H04N 13/282; H04N 13/32; H04N 13/349; H04N 13/398;
(Continued)

(56) References Cited

U.S. PATENT DOCUMENTS 7,506,011 B2 * 3/2009 Liu .................. G06F 16/273
8,305,899 B2 * 11/2012 Luo .................. H04W 8/04
370/428
(Continued)

FOREIGN PATENT DOCUMENTS

EP 2418862 2/2012
TW 201207433 A 2/2012
(Continued)

OTHER PUBLICATIONS

"International Application Serial No. PCT/US2023/021275, International Search Report mailed Aug. 4, 2024", 3 pgs.
(Continued)

*Primary Examiner* — Frank F Huang
(74) *Attorney, Agent, or Firm* — Schwegman, Lundberg & Woessner, P.A.

(57) ABSTRACT

A predictive head-tracking multiview display includes a multibeam backlight that provides a plurality of light beams having different principal angular directions corresponding to different view directions of a multiview image. A processor receives a plurality of provisional views of the multiview image. The provisional views correspond to the different view directions. The processor receives information about a predicted position of a user. The processor shifts the provisional views with respect to the view directions to form a plurality of shifted views that correspond to the different view directions. The shifted views are shifted by a shift value that varies as a function of the predicted position of the user and varies over a field of view of the multiview image. A light valve array modulates the plurality of light beams to provide the plurality of shifted views of the multiview image to the view directions as the multiview image.

20 Claims, 7 Drawing Sheets

(51) Int. Cl.
| | |
|---|---|
| *G09G 3/02* | (2006.01) |
| *G09G 3/34* | (2006.01) |
| *G09G 3/36* | (2006.01) |
| *H04N 13/282* | (2018.01) |
| *H04N 13/32* | (2018.01) |
| *H04N 13/349* | (2018.01) |
| *H04N 13/366* | (2018.01) |
| *H04N 13/398* | (2018.01) |

(52) U.S. Cl.
CPC ......... *G09G 3/3611* (2013.01); *H04N 13/282* (2018.05); *H04N 13/32* (2018.05); *H04N 13/349* (2018.05); *H04N 13/398* (2018.05); *G09G 2354/00* (2013.01)

(58) Field of Classification Search
CPC ...... G09G 3/007; G09G 3/025; G09G 3/3426; G09G 3/3611; G09G 2354/00
See application file for complete search history.

(56) References Cited

U.S. PATENT DOCUMENTS

| | | | |
|---|---|---|---|
| 10,510,188 B2 | 12/2019 | Schowengerdt et al. | |
| 10,750,163 B2 | 8/2020 | Koerber et al. | |
| 2012/0032952 A1 | 2/2012 | Lee et al. | |
| 2012/0237461 A1* | 9/2012 | Yu | A61K 8/25 424/59 |
| 2012/0251600 A1* | 10/2012 | Yu | A61K 8/585 424/78.03 |
| 2014/0004073 A1* | 1/2014 | Yu | A61Q 19/08 424/78.03 |
| 2015/0323525 A1* | 11/2015 | Vidarsson | G01N 33/54373 506/9 |
| 2016/0238852 A1 | 8/2016 | Ellsworth et al. | |
| 2016/0364904 A1 | 12/2016 | Parker et al. | |
| 2017/0100032 A1* | 4/2017 | Zakariaie | A61B 3/0025 |
| 2017/0150133 A1* | 5/2017 | Yoshida | H04N 13/393 |
| 2018/0278923 A1 | 9/2018 | Fattal | |

FOREIGN PATENT DOCUMENTS

| | | |
|---|---|---|
| TW | 202136969 A | 10/2021 |
| TW | 202409794 A | 3/2024 |
| TW | 1848692 B | 7/2024 |
| WO | 2020046259 | 3/2020 |
| WO | WO-2023219916 A1 | 11/2023 |

OTHER PUBLICATIONS

"International Application Serial No. PCT/US2023/021275, Written Opinion mailed Aug. 4, 2024", 4 pgs.

"Taiwanese Application Serial No. 112117219, Office Action mailed Jan. 11, 2024", w/ English translation, 20 pgs.

"Taiwanese Application Serial No. 112117219, Response Filed Apr. 12, 2024 to Office Action mailed Jan. 11, 2024", w/ English Claims, 21 pgs.

"International Application Serial No. PCT US2023 021275, International Preliminary Report on Patentability mailed Nov. 21, 2024", 6 pgs.

"European Application Serial No. 23804052.1, Voluntary Amendment filed Dec. 11, 2024", 7 pgs.

"European Application Serial No. 23804052.1, Extended European Search Report mailed Jun. 27, 2025", 9 pgs.

* cited by examiner

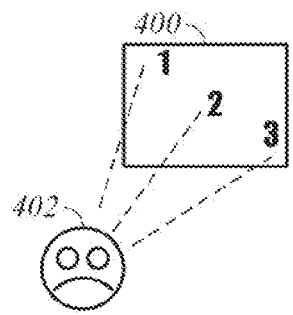
FIG. 4
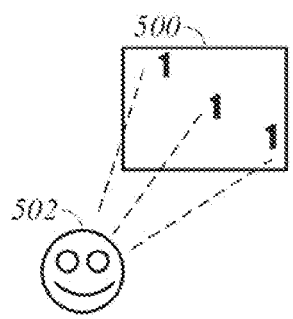 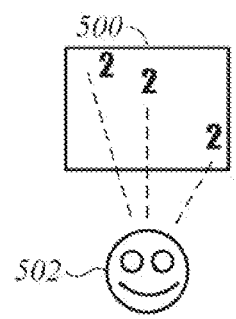 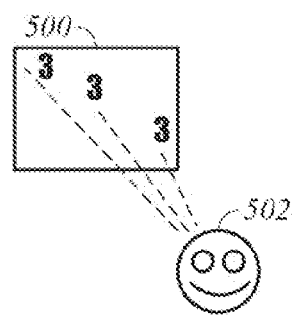
FIG. 5A   FIG. 5B   FIG. 5C
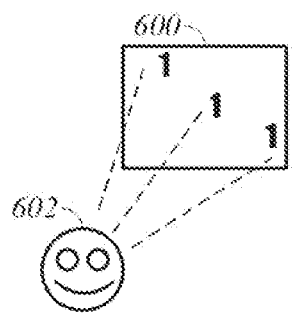 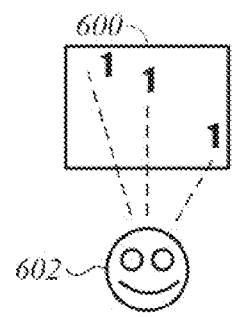 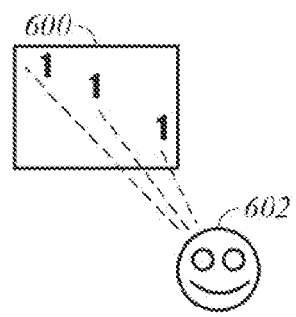
FIG. 6A   FIG. 6B   FIG. 6C

PREDICTIVE HEAD-TRACKING MULTIVIEW DISPLAY AND METHOD

CROSS-REFERENCE TO RELATED APPLICATION

This application is a U.S. National Stage Filing under 35 U.S.C. 371 from International Application No. PCT/US2023/021275, filed on May 6, 2023, and published as WO 2023/219916, which claims priority to U.S. Provisional Patent Application Ser. No. 63/340,369, filed May 10, 2022, the entirety of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active-matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Examples of active displays include CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which:

FIG. 4 illustrates a plan view of an example of a shift-invariant head-tracking multiview display in which the shift value does not vary over a field of view the multiview image.

FIG. 5A illustrates a plan view of a head-tracking multiview display used in peeling mode in an example, according to an embodiment consistent with the principles described herein, in which a user is located at a first position.

FIG. 5B illustrates a plan view of the head-tracking multiview display used in peeling mode in an example, according to an embodiment consistent with the principles described herein, in which a user is located at a second position.

FIG. 5C illustrates a plan view of the head-tracking multiview display used in peeling mode in an example, according to an embodiment consistent with the principles described herein, in which a user is located at a third position.

FIG. 6A illustrates a plan view of a head-tracking multiview display used in sliding mode in an example, according to an embodiment consistent with the principles described herein, in which a user is located at a first position.

FIG. 6B illustrates a plan view of the head-tracking multiview display used in sliding mode in an example, according to an embodiment consistent with the principles described herein, in which a user is located at a second position.

FIG. 6C illustrates a plan view of the head-tracking multiview display used in sliding mode in an example, according to an embodiment consistent with the principles described herein, in which a user is located at a third position.

Figure 1:
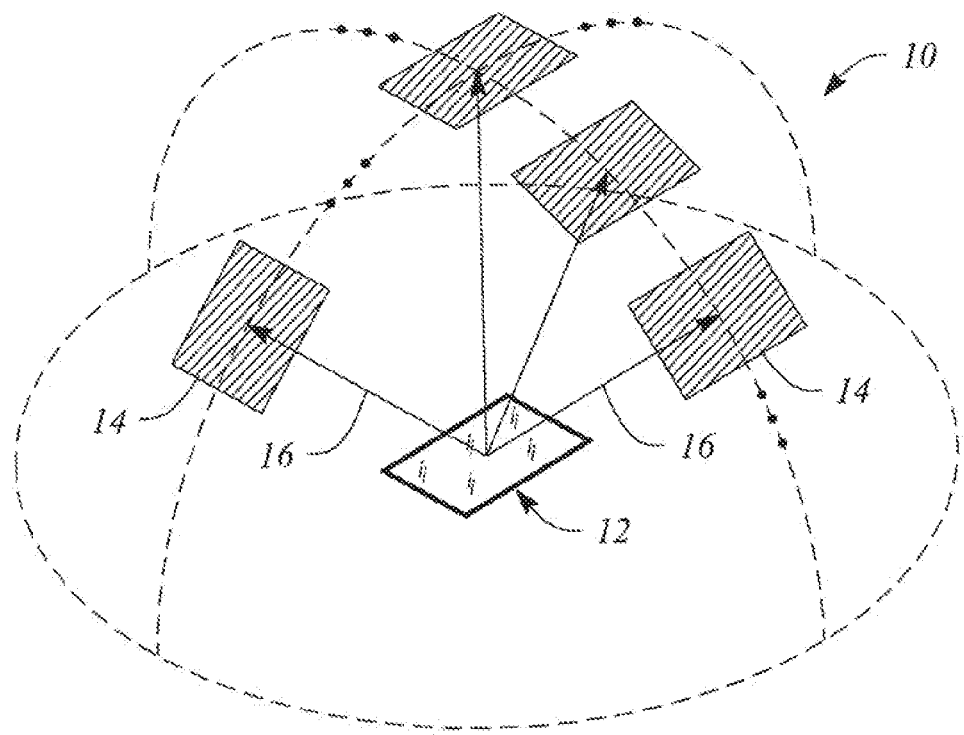
FIG. 1 illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview or three-dimensional (3D) image display that employs information about a user location over time, sometimes referred to as 'head-tracking' or alternatively as 'head-tracked'. Embodiments consistent with the principles described herein may employ a multiview display to provide different sets of views of a scene represented by a multiview image depending on a location of a user. A head-tracking multiview display may receive provisional views of the multiview image corresponding to different view directions. The head-tracking (or head-tracked) multiview display may receive information about a predicted position of a user, such as from multiple tracked positions of the user obtained from a head-tracking sensor. In some examples, the predicted position can include a forecast about what is most likely to happen in the future based on current information, past experience, or a model or formula, and an estimation as a set of the potential approximations or values or quantities for the prediction. In some examples, the predicted position can include a "best" or most likely estimation of the future position. The head-tracking (or head-tracked) multiview display may shift the provisional views with respect to the view directions to form shifted views that correspond to the different view directions. The shifted views may be shifted by a shift value that varies as a function of the predicted position of the user and varies over a field of view of the multiview image.

Using a shift value that varies over a field of view of the multiview image may be beneficial. For example, in a display that uses a shift value that is invariant over a field of view of the multiview image, a user may perceive different views of the multiview image at different locations on the display, which may be disconcerting or jarring to the user. As a specific example, a user may concurrently perceive one portion of the display as showing a first view, and another portion of the display as showing a second view. In contrast, in a display in which the shift value varies over a field of view of the multiview image as detailed below, the user may perceive a same view over a full field of view of the multiview image. Presenting the multiview image such that the user perceives the same view over a field of view of the multiview image (e.g., avoiding a situation in which a user perceives one portion of the display showing a first view and another portion of the display showing a second view) may provide a more realistic viewing experience for the user. In a specific example, one eye of the user may perceive a first view over a full field of view of the multiview image, and the other eye of the user may perceive a second view over a full field of view of the multiview image, such that the user may experience a stereoscopic effect.

In various embodiments, a head tracking sensor or algorithm may provide information about a position or location of the user relative to the multiview display. That is, the user location may be determined or inferred by tracking a location of a user's head or other anatomical feature. To facilitate discussion herein and without limitation, embodiments or components described herein may be referred to as including or using 'head-tracking' such as in multiview displays, systems, and methods that employ head tracking, for example.

Further, the head tracking sensor or algorithm may account for movement of the user. For example, the head-tracking (or head-tracked) multiview display may shift the provisional views with respect to the view directions to form shifted views that correspond to the different view directions. The shifted views may be shifted by a shift value that varies as a function of a predicted position of the user. The predicted position can be determined from past tracked positions, such as by determining a velocity or determining a velocity and acceleration from the past tracked positions. The shift value may account for delays caused by one or both of a raster scan of a display panel and a raster scan or rolling shutter of a head-tracking sensor. The shift value may vary over a field of view of the multiview image.

In various embodiments, a predictive head-tracking multiview display may include a multibeam backlight that provides a plurality of light beams having different principal angular directions corresponding to different view directions of a multiview image. A processor may receive a plurality of provisional views of the multiview image. The provisional views may correspond to the different view directions. The processor may receive information about a predicted position of a user. The processor may shift the provisional views with respect to the view directions to form a plurality of shifted views that correspond to the different view directions. The shifted views may be shifted by a shift value that varies as a function of the predicted position of the user and varies over a field of view of the multiview image. A light valve array may modulate the plurality of light beams to provide the plurality of shifted views of the multiview image to the view directions as the multiview image.

FIG. 1 illustrates a perspective view of a multiview display 10 in an example, according to an embodiment consistent with the principles described herein. As illustrated in FIG. 1, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions. The different views 14 are illustrated as shaded polygonal boxes at the termination of the arrows (i.e., depicting the view directions 16). Only four views 14 and four view directions 16 are illustrated, all by way of example and not limitation. Note that while the different views 14 are illustrated in FIG. 1 as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 2:
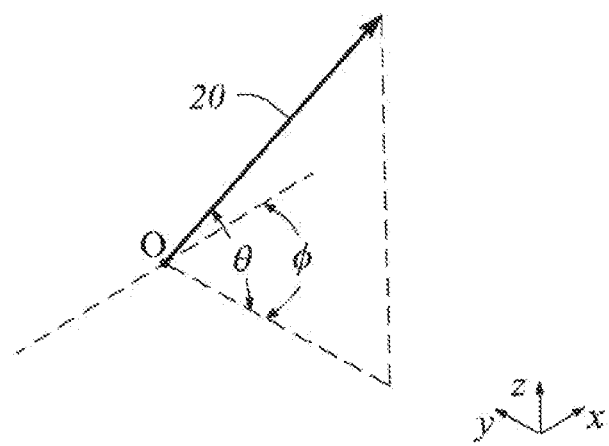
FIG. 2 illustrates a graphical representation of the angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 2 illustrates a graphical representation of the angular components $\{\theta, \phi\}$ of a light beam 20 having a particular principal angular direction corresponding to a view direction (e.g., view direction 16 in FIG. 1) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 2 also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels representing 'view' pixels in each of a similar plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piecewise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, a 'multiview image' is defined as a plurality of images (i.e., greater than three images) wherein each image of the plurality represents a different view corresponding to a different view direction of the multiview image. As such, the multiview image is a collection of images (e.g., two-dimensional images) which, when display on a multiview display, may facilitate a perception of depth and thus appear to be an image of a 3D scene to a user, for example. A multiview image that provides pairs of views that represent different but related perspectives of a 3D scene consistent with viewing by a user is defined as a 3D image.

Embodiments consistent with the principles described herein may be implemented using a variety of devices and circuits including, but not limited to, one or more of integrated circuits (ICs), very large scale integrated (VLSI) circuits, application specific integrated circuits (ASIC), field programmable gate arrays (FPGAs), digital signal processors (DSPs), graphical processor unit (GPU), and the like, firmware, software (such as a program module or a set of instructions), and a combination of two or more of the above. For example, an embodiment or elements thereof may be implemented as circuit elements within an ASIC or a VLSI circuit. Implementations that employ an ASIC or a VLSI circuit are examples of hardware-based circuit implementations.

In another example, an embodiment may be implemented as software using a computer programming language (e.g., C/C++) that is executed in an operating environment or a software-based modeling environment (e.g., MATLAB®, MathWorks, Inc., Natick, MA) that is further executed by a computer (e.g., stored in memory and executed by a processor or a graphics processor of a general-purpose computer). Note that one or more computer programs or software may constitute a computer-program mechanism, and the programming language may be compiled or interpreted, e.g., configurable or configured (which may be used interchangeably in this discussion), to be executed by a processor or a graphics processor of a computer.

In yet another example, a block, a module or an element of an apparatus, device or system (e.g., image processor, camera, etc.) described herein may be implemented using actual or physical circuitry (e.g., as an IC or an ASIC), while another block, module or element may be implemented in software or firmware. In particular, according to the definitions herein, some embodiments may be implemented using a substantially hardware-based circuit approach or device (e.g., ICs, VLSI, ASIC, FPGA, DSP, firmware, etc.), while other embodiments may also be implemented as software or firmware using a computer processor or a graphics processor to execute the software, or as a combination of software or firmware and hardware-based circuitry, for example.

Further, as used herein, the article 'a' is intended to have its ordinary meaning in the patent arts, namely 'one or more'. For example, 'a lens' means one or more lenses and as such, 'the lens' means 'the lens or lenses' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
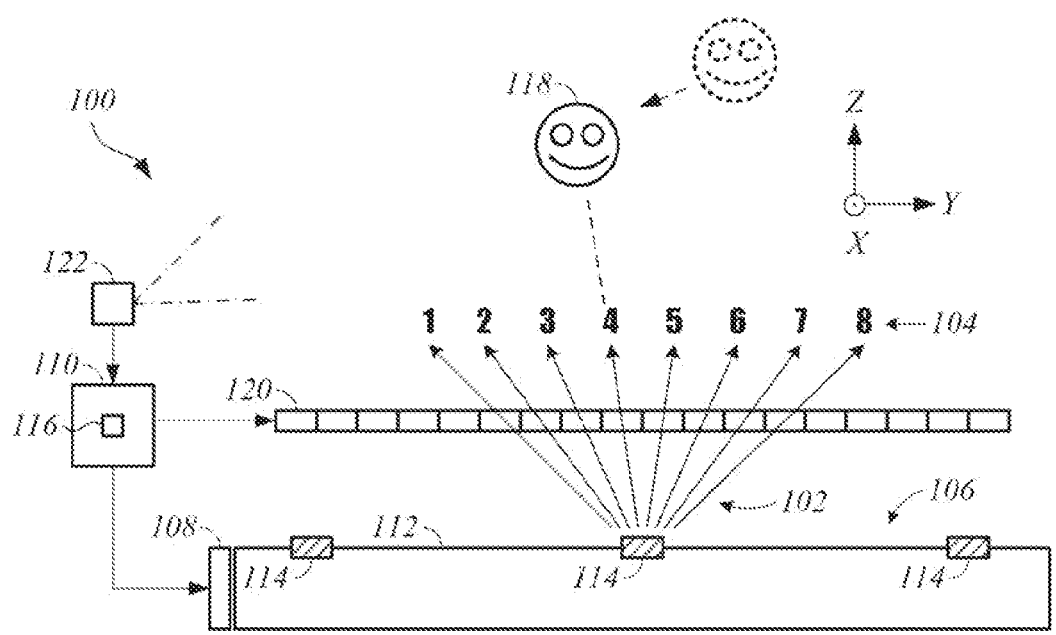
FIG. 3 illustrates a cross sectional view of a head-tracking multiview display in an example, according to an embodiment consistent with the principles described herein.

According to some embodiments of the principles described herein, a head-tracking multiview display 100 is provided. The head-tracking multiview display 100 may be referred to as a head-tracked multiview display, in some embodiments. FIG. 3 illustrates a cross sectional view of a head-tracking multiview display 100 in an example, according to an embodiment consistent with the principles described herein. The head-tracking multiview display 100 is configured to provide a plurality of views of a scene as a multiview image, i.e., a displayed multiview image. In particular, the plurality of views is provided in a corresponding plurality of view directions by the head-tracking multiview display 100. In FIG. 3, the view directions or equivalently the views of the view plurality are depicted as arrows 102 pointing in different angular directions that extend from the head-tracking multiview display 100. For convenience, the view directions or equivalently the views of the view plurality are labeled with view-identifying numerals 104. In the specific example of FIG. 3, the head-tracking multiview display 100 provides eight views; other numbers of views may also be used. The views in FIG. 3 are identified with view-identifying numerals 104 as being 1 through 8; other identifiers may also be used, such as letters A through H. The view-identifying numerals 104 of FIG. 3 are provided merely as a convenience, and do not imply that the views are sequential or ordered in any way.

As illustrated in FIG. 3, the head-tracking multiview display 100 comprises a multibeam backlight 106. The multibeam backlight 106 is configured to provide a plurality of light beams having different principal angular directions corresponding to different view directions of the multiview image. In the configuration of FIG. 3, the multibeam backlight 106 may include a light source 108, which is controlled by a controller 110. The light source 108 may direct light into an edge of a light guide 112. The light guide 112 may propagate the light within the light guide 112 as guided light. A plurality of multibeam elements 114 may direct respective portions of the guided light out of the light guide 112 to form the plurality of light beams. The configuration of the multibeam backlight 106 shown in FIG. 3 is but one example of a multibeam backlight 106; other suitable configurations may also be used.

As illustrated in FIG. 3, the head-tracking multiview display 100 further comprises a processor 116. In the example of FIG. 3, the processor 116 is included with the controller 110. In other configurations, the processor 116 may be separate from the controller 110. The processor 116 is configured to receive a plurality of provisional views of the multiview image. The plurality of provisional views may correspond to the different view directions. The processor 116 is further configured to receive information about a predicted position of a user 118, such as including information about a predicted direction or predicted distance between the user 118 and a light-emitting portion of the display. In an example, the predicted position of the user 118 may include information about a predicted view direction of the user 118. The processor 116 is further configured to shift the provisional views with respect to the view directions to form a plurality of shifted views that correspond to the different view directions. In various embodiments, the shifted views are shifted by or according to a shift value. The shift value may vary as a function of the predicted position of the user 118. In various embodiments, the shift value may also vary over a field of view of the multiview image. Details are provided below regarding calculation of the shift value.

As illustrated in FIG. 3, the head-tracking multiview display 100 further comprises a light valve array 120. The light valve array 120 is configured to modulate light beams of the plurality of light beams to provide the plurality of shifted views of the multiview image to the view directions as the multiview image. The light valve array 120 may be controlled by the controller 110. In various embodiments, any of a variety of different types of light valves may be employed as light valves of the light valve array 120 including, but not limited to, one or more of liquid crystal light valves, electrophoretic light valves, and light valves based on electrowetting.

As illustrated in FIG. 3, the head-tracking multiview display 100 further comprises a head tracker 122. The head tracker 122 is configured to provide a tracked position of the user 118 (e.g., of a head of the user 118, or of one or both eyes of the user 118, or of another anatomical feature of the user 118). The head tracker 122 may be coupled to the processor 116, such that the processor 116 may store multiple tracked positions over time (e.g., tracked positions obtained at regular or irregular time intervals). The processor 116 may use the stored tracked positions to determine a predicted position, as explained below. The head tracker 122 may include a camera configured to capture an image of the user 118. The head tracker 122 may further include an image processor (or general-purpose computer programmed as an image processor) configured to determine a position of the user 118 within the captured image to provide the tracked position. In some examples, the processor 116 may include the image processor of the head tracker 122, such as by performing operations with the same processing circuitry. In other examples, the processor 116 may be separate from the image processor of the head tracker 122. Other suitable head trackers may also be used, including head trackers based on lidar (e.g., using time-of-flight of reflected light over a scene to of view to determine distances to one or more objects in the scene, such as a user's head or a user's eyes) or other technologies. An output of the head tracker 122 may be used to modify an operation (e.g., modulation of light beams by the light valve array 120) of the head-tracking multiview display 100. For example, the determined position of the user 118 may be provided to one or both of a processor (such as processor 116) and a light valve driver (e.g., driver circuit, or controller 110) of the head-tracking multiview display 100 to adjust the emission pattern from the head-tracking multiview display 100 to correspond to the user's position. Other examples of the head tracker 122 implementations may include any of a variety of two-dimensional (2D) and three-dimensional (3D) object tracking systems such as, but are not limited to, Kinect® object tracking system. Kinect® is a registered trademark of Microsoft Corporation, Redmond, WA.

As mentioned above, and explained in detail below, the head-tracking multiview display 100 of FIG. 3 determines a shift value that varies over a field of view of the multiview image. To demonstrate the effect of varying the shift value over a field of view of the multiview image, FIG. 4 illustrates a plan view of an example of a shift-invariant head-tracking multiview display 400 in which the shift value does not vary over a field of view of the multiview image. Instead, the shift value is constant or invariant over a field of view of the multiview image, such as over a field of view of an active surface area of the shift-invariant head-tracking multiview display 400.

In the example of FIG. 4, for some locations of the user 402, different regions of the multiview image may be visible with different views of the multiview image. For example, a top-left corner of the multiview image may be visible with view number 1, a central portion of the multiview image may be visible with view number 2, and a bottom-right corner of the multiview image may be visible with view number 3. Because the image perceived by the user 402 at the user location relative to the shift-invariant head-tracking multiview display 400 may include regions that are from different views of the multiview image, the perceived image may be distorted or may contain artifacts from misalignment of the views or at boundaries between the different view portions.

Varying the shift value over a field of view of the multiview image may help overcome a drawback of the shift-invariant head-tracking multiview display 400. Specifically, varying the shift value over a full field of view the multiview image may help ensure that all or substantially all of the multiview image shows a single view (or a single combination of views) to the user. The following paragraphs describe an example of determination of the shift value in detail.

The processor 116 may determine the shift value to provide two general functions for the head-tracking multiview display 100. A first general function of the shift value is to direct a specified view toward an eye of the user 118, as the user 118 changes location with respect to the display. A second general function of the shift value is to ensure that over the entire multiview image (such as extending over a specified active surface area of the head-tracking multiview display), only a single specified view (or a specified combination of views) is visible, such that adjacent views or spurious views are not visible. In other words, calculating the shift value as detailed below may ensure that a user 118 does not see one portion of the multiview image in a first view and another portion of the multiview image in a second view, thereby avoiding the example of the shift-invariant head-tracking multiview display 400 of FIG. 4.

The processor 116 may include a mathematical model that predicts which view is visible to the user 118 as a function of the user 118 location and as a function of the user 118 view direction at or over a surface area of the head-tracking multiview display. The view may be expressed as a real number. For example, for a multiview image that includes eight views, the views may be represented by an integer N, where N may have an integer value from one to eight, inclusive. The user 118 may have a center head position, expressed in spatial coordinates as (x, y, z). The head-tracking multiview display may have a pixel position, expressed in spatial coordinates as $(x_0, y_0)$, within an active surface area of the head-tracking multiview display. The mathematical model may determine the view number N(x, y, z, $x_0$, $y_0$), which is a function of user location and pixel position. In other words, for each combination of user location (x, y, z) and pixel position $(x_0, y_0)$, the mathematical model may determine which view N is visible.

The shift value, represented as quantity $\delta N$, is a dimensionless quantity that represents a correction or addition to the view number N. For example, a shift value $\delta N$ of +1 may involve incrementing a view number (e.g., view number 3) by a value of +1 (e.g., to view number 4). The shift value $\delta N$ may vary from pixel position to pixel position over an active surface area of the head-tracking multiview display (e.g., over a field of view of the multiview image). Allowing the shift value $\delta N$ to vary over a field of view of the multiview image may ensure that a user 118 sees only one specified multiview image (or one specified combination of multiview images) over the entire multiview image.

The processor may calculate the shift value to achieve a particular effect in the perceived views. Two such effects are referred to below as a "peeling mode" and a "sliding mode," both of which are explained in greater detail below.

In the peeling mode, when a user 118 changes location, the views may progress from view to view, so that the user 118 may view the multiview image from many different views, depending on the location of the user 118. In some embodiments, in the peeling mode, the shift value may be selected such that movement of the user 118 allows the user 118 to view views in a progression that matches a progression of the provisional views. In some embodiments, in the peeling mode, the shift value may be selected such that movement of the user 118 provides the user a sensation of parallax as the views progress.

The peeling mode may extend a view zone of the head-tracking multiview display without altering the parallax effect. In the peeling mode, the shift value $\delta N$ may be calculated as a function of a static view number $N_0$ that is invariant with respect to user location and pixel position, a central view number N(x, y, z, 0, 0) that represents which view is visible at a center of the display from the user location, and a pixel-dependent view number N(x, y, z, $x_0$, $y_0$) that represents which view is visible at a specified pixel position from the user location, as follows:

$$\delta N = N_0 + N(x,y,z,0,0) - N(x,y,z,x_0,y_0) \qquad (1)$$

FIG. 5A illustrates a plan view of a head-tracking multiview display 500 used in peeling mode in an example, according to an embodiment consistent with the principles described herein, in which a user 502 is located at a first position. At the first position, the user 502 may view a first view (denoted by numeral 1) of the multiview image over the entire multiview image.

FIG. 5B illustrates a plan view of the head-tracking multiview display 500 used in peeling mode in an example, according to an embodiment consistent with the principles described herein, in which a user 502 is located at a second position. At the second position, the user 502 may view a second view (denoted by numeral 2) of the multiview image over the entire multiview image.

FIG. 5C illustrates a plan view of the head-tracking multiview display 500 used in peeling mode in an example, according to an embodiment consistent with the principles described herein, in which a user 502 is located at a third position. At the third position, the user 502 may view a third view (denoted by numeral 3) of the multiview image over the entire multiview image.

In the sliding mode, when the user 118 changes location, a single view (or a single combination of views) follows the user 118. For example, the sliding mode may act effectively as an image stabilizer, which may ensure that the user 118 sees only a specified view (or a specified combination of views) and prevents other views from being visible as the user 118 changes location. In some embodiments, in the sliding mode, the shift value may be selected such that the shifted views follow movement of the user 118 and allow the user 118 to view only a single view or a single combination of views as the user 118 moves. The sliding mode may ensure that the user 118 experiences a uniform, static view, denoted by the quantity $N_0$, with no parallax. In the sliding mode, the head-tracking may effectively counteract any motion of the user 118 and may provide the user 118 with a 3D experience similar to using 3D glasses in a movie theater.

Using the same quantities as defined above, the shift value $\delta N$ may be calculated as follows:

$$\delta N = N_0 - N(x,y,z,x_0,y_0) \tag{2}$$

FIG. 6A illustrates a plan view of a head-tracking multiview display 600 used in sliding mode in an example, according to an embodiment consistent with the principles described herein, in which a user 602 is located at a first position. At the first position, the user 602 may view a first view (denoted by numeral 1) of the multiview image over the entire multiview image.

FIG. 6B illustrates a plan view of the head-tracking multiview display 600 used in sliding mode in an example, according to an embodiment consistent with the principles described herein, in which a user 602 is located at a second position. At the second position, the user 602 may view the first view (denoted by numeral 1) of the multiview image over the entire multiview image.

FIG. 6C illustrates a plan view of the head-tracking multiview display 600 used in sliding mode in an example, according to an embodiment consistent with the principles described herein, in which a user 602 is located at a third position. At the third position, the user 602 may view the first view (denoted by numeral 1) of the multiview image over the entire multiview image.

In some embodiments, the shift value may be selected to a first three-dimensional view of the multiview image to a left eye of the user 118 and a second three-dimensional view of the multiview image to a right eye of the user 118, the first and second three-dimensional views being invariant as the user 118 moves.

In general, the shift value $\delta N$ may not be an integer, but may be a sum of an integer k and a decimal q that is between zero and one, exclusive. For example, in some embodiments, the shift value may correspond to a non-integer number of views of the multiview image. As another example, in some embodiments, the shift value may correspond to a non-integer number of light valves on the light valve array. Where a purely integer shift value $\delta N$ may involve shifting one view to an angular location of another view, a fractional (e.g., non-integer) shift value $\delta N$ may involve combining adjacent views to form a combined view or a fractional view. There are many possible ways to combine adjacent views to form the combined view. In some embodiments, the processor may be configured to form the shifted views by combining two adjacent provisional views. In some embodiments, the processor may be configured to form the shifted views by non-linearly combining the two adjacent provisional views, i.e., combining the two adjacent provisional views in a non-linear manner.

In some embodiments, the processor is configured to form the shifted views by converting pixel values of the two adjacent provisional view from gamma space to linear space to form linear space pixel values, summing the linear space pixel values linearly to form a linear sum value, and converting the linear sum value from linear space to gamma space. For example, a non-linear mixing function $f(q)$ may be defined to have a value of 0 for q=0, a value of 0.5 for q=0.5, and a value of 1 for q=1, a dimensionless exponent γ may convert red-green-blue (RBG) pixel values from gamma space to linear space, pixel value of a view k may be denoted by quantity $V_k$, a pixel value of an adjacent view k+1 may be denoted by quantity $V_{k+1}$, and the pixel value of a fractional view k+q may be denoted by $V_{k+q}$, and calculated as follows:

$$V_{k+q} = [(1-f(q))(V_k)^\gamma + (f(q))(V_{k+1})^\gamma]^{1/\gamma} \tag{3}$$

In some examples in which different color sub-pixels correspond to different views, the shift value $\delta N$ may be calculated separately for each color.

In accordance with some embodiments of the principles described herein, a head-tracking multiview display system is provided. The head-tracking multiview display system is configured to provide or to 'display' a 3D or multiview image representing a scene. In particular, the multiview image is provided as a plurality of different 'views' associated with the multiview image. The different views may provide a 'glasses free' (e.g., autostereoscopic) representation of information in the multiview image being displayed, for example. Moreover, different sets of views may be provided for different locations or positions (e.g., head locations) of a user of the head-tracking multiview display system, according to various embodiments.

As explained above, the shift value may vary over the field of view of the multiview image. In addition, the shift value may include a temporal correction, so that the controller or processor can determine the shift value based on where the user is expected to be at a future time, rather than at the most recent measured position or tracked position. For example, the controller can use past measured positions or past tracked positions to determine a predicted position of the user at a specified future time. The specified future time can be offset from the present time or a reference time by a location-dependent time interval that accounts for any or all of the following: a raster scan of the light valve array (e.g., a location-dependent delay), a latency of the light valve array (e.g., a location-independent delay), a rolling shutter of the head tracker, and a latency of the head tracker. Using a predicted position rather than a most recent tracked position can help reduce or eliminate artifacts, such as crosstalk with an adjacent view, when the user is moving with respect to the head-tracking multiview display system. Other types of shutters can also be used, including global shutters, or another suitable exposure-modulating mechanism.

In some embodiments, the predicted position may include a predicted position at a future time. The future time may differ from a reference time by a latency of the light valve array.

In some embodiments, the light valve array may include a raster scan. The light valve array may have a latency that varies across the light valve array as a function of the raster scan. The predicted position may include a predicted position at a location-dependent future time. The location-dependent future time may differ from a reference time by the latency of the light valve array.

In some embodiments, the processor may be further configured to determine the predicted position of the user based on a plurality of past measured positions of the user.

In some embodiments, the predictive head-tracking multiview display may further include a head tracker configured to provide the plurality of past measured positions of the user. The head tracker may include a camera configured to capture sequential images of the user. The head tracker may further include an image processor configured to determine a position of the user within each captured image to provide the plurality of past measured positions.

In some embodiments, the processor may be further configured to calculate a velocity of the user from at least two past measured positions of the plurality of past measured positions. The processor may be further configured to determine the predicted position of the user based on the velocity of the user and a most recent measured position of the plurality of past measured positions. For these configurations, the processor performs the calculation using the assumption that the velocity of the user is constant or nearly constant over time, over the relatively short duration of a single frame of the light valve array operating at a video rate, such as 30 Hz, 60 Hz, 75 Hz, 90 Hz, 120 Hz, greater than 120 Hz, or another suitable value.

Mathematically, performing the calculation using the assumption that the velocity of the user is constant or nearly constant over time may appear as follows. For a most recent tracked position denoted by quantity $x_0$, a quantity T denoting a time delay that corresponds to a particular light valve on the light valve array (and, optionally, a particular location on a sensor of the head tracker), and a velocity v, the predicted position x is given by the quantity $x_0+vT$.

The processor may calculate the velocity, v, as follows. For a head tracker performing measurements numbered 1, 2, 3, etc., at times $T_1$, $T_2$, $T_3$, etc., the past measurements of user position x may be expressed as $x_1$, $x_2$, $x_3$, etc. The processor may calculate velocity, v, as the quantity $(x_i-x_j)/(T_i-T_j)$, where measurements i and j are past tracked measurements. In some examples, the processor may calculate velocity, v, as the quantity $(x_2-x_1)/(T_2-T_1)$, where measurements 1 and 2 are the two most recent tracked measurements. In some examples, the processor may calculate velocity using two measurements that are not directly sequential (e.g., that include one or more measurements between them). In some examples, the processor may calculate velocity using more than two measurements, such as a rolling average of velocity calculations. Other suitable calculation techniques can also be used. It will be understood that position and velocity are multi-dimensional quantities, and that the expressions provided above pertain to only one dimensional component (such as x); similar expressions can be written for the other dimensional components (such as y and z).

In some embodiments, the processor may be further configured to calculate an acceleration of the user from at least three measured positions of the plurality of past measured positions. The processor may be further configured to determine the predicted position of the user based on the acceleration of the user, the velocity of the user, and a most recent measured position of the plurality of past measured positions.

Mathematically, performing the calculation using the velocity of the user and the acceleration of the user may appear as follows. For a most recent tracked position denoted by quantity $x_0$, a quantity T denoting a time delay that corresponds to a particular light valve on the light valve array (and, optionally, a particular location on a sensor of the head tracker), a velocity v, and an acceleration a, the predicted position x is given by the quantity $x_0+vT+(aT^2)/2$.

The processor may calculate the acceleration, a, as follows. Using the same numbering scheme as described above, the head tracker and processor may form calculations of user velocity as $v_1$, $V_2$, $v_3$, etc. The processor may calculate acceleration, a, as the quantity $(v_i-v_j)/(T_i-T_j)$, where measurements i and j are past tracked measurements at times $T_i$ and $T_j$. In some examples, the processor may calculate acceleration, a, as the quantity $(v_2-v_1)/(T_2-T_1)$, where measurements 1 and 2 are the two most recent tracked measurements. In some examples, the processor may calculate acceleration using two velocity measurements that are not directly sequential (e.g., that include one or more measurements between them). In some examples, the processor may calculate acceleration using more than two velocity measurements, such as a rolling average of acceleration calculations. Other suitable calculation techniques can also be used. It will be understood that position, velocity, and acceleration are multi-dimensional quantities, and that the expressions provided above pertain to only one dimensional component (such as x); similar expressions can be written for the other dimensional components (such as y and z).

In some embodiments, the controller may implement feedback, such as updating or changing a predicted position continuously or in discrete increments, based on a detected actual position or a detected actual change in position or view direction.

In some embodiments, the controller may implement pattern matching for predicting position. Pattern matching may assist and/or replace velocity and/or acceleration to determine the predicted position. For example, a user's behavior pattern may be unique to the user based on historical information about the user or may be based on program content. As a specific example, the multiview images may show a car driving across the field of view and the controller may "expect" the user's look direction or head to follow the car. Other examples can also be used.

Figure 7:
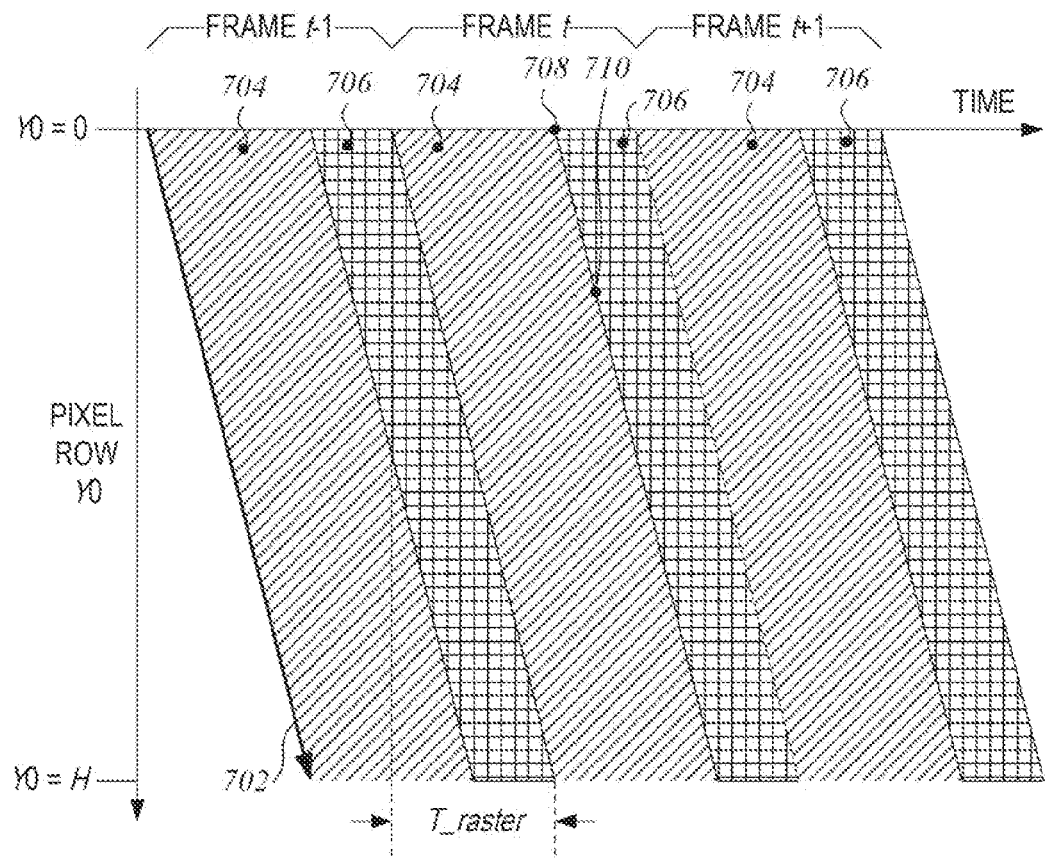
FIG. 7 illustrates a plot that shows a model for display latency for a head-tracking multiview display in an example, according to an embodiment consistent with the principles described herein.

FIG. 7 illustrates a plot that shows a model for display latency for a head-tracking multiview display in an example, according to an embodiment consistent with the principles described herein. The model includes a plot of pixel position (or pixel row) along the vertical axis, as a function of time along the horizontal axis.

A line 702, extending from a top-left position to a bottom-right position, may represent a gate scan of the display. Diagonally cross-hatched regions 704 may correspond to regions during which pixels of a liquid crystal panel are sequentially switching between a first state, corresponding to a current frame, to a second state, corresponding to a next frame that sequentially follows the current frame. FIG. 7 shows three sequential frames, denoted as frame t−1, frame t, and frame t+1. Checkerboard cross-hatched regions 706 may correspond to regions during which the liquid crystal panel is idle. A time duration between a beginning of a raster scan of the liquid crystal panel to an end of the raster scan of the liquid crystal panel is given by quantity T_raster.

Assuming that the display has a height H and raster scans with a uniform rate, the delay $\Delta T(y)$, as a function of pixel row y and corresponding to location 710 in FIG. 7, may be calculated as follows:

$$\Delta T(y) = \Delta T(0) + \left(\frac{y}{H}\right)\text{T\_raster} \qquad (4)$$

Quantity $\Delta T(0)$ is a time value corresponding to a beginning of a raster scan and corresponding to location 708 in FIG. 7. Quantity T_raster is a time duration representing how long it takes the display to raster scan the entire display area.

Equation (5) shows how a total delay associated with a given pixel may be calculated, as follows:

$$\Delta T(y0, y) = (R - E) + T\left(1 - \frac{y}{H}\right) + T0\left(\frac{y0}{H0}\right) \quad (5)$$

Quantity ΔT(y0,y) represents a delay as a function of pixel location. Quantity R corresponds to a time at which the raster scan is begun. Quantity E corresponds to a time at which an exposure time is ended. Quantity T corresponds to a raster time of the display (e.g., how long it takes the display to fully scan the display area). Quantity H is a height of the display. Quantity T0 is an exposure time of the display. Quantities y and y0 have values of zero at a top (or other suitable edge) of the display or camera frame.

Figure 8:
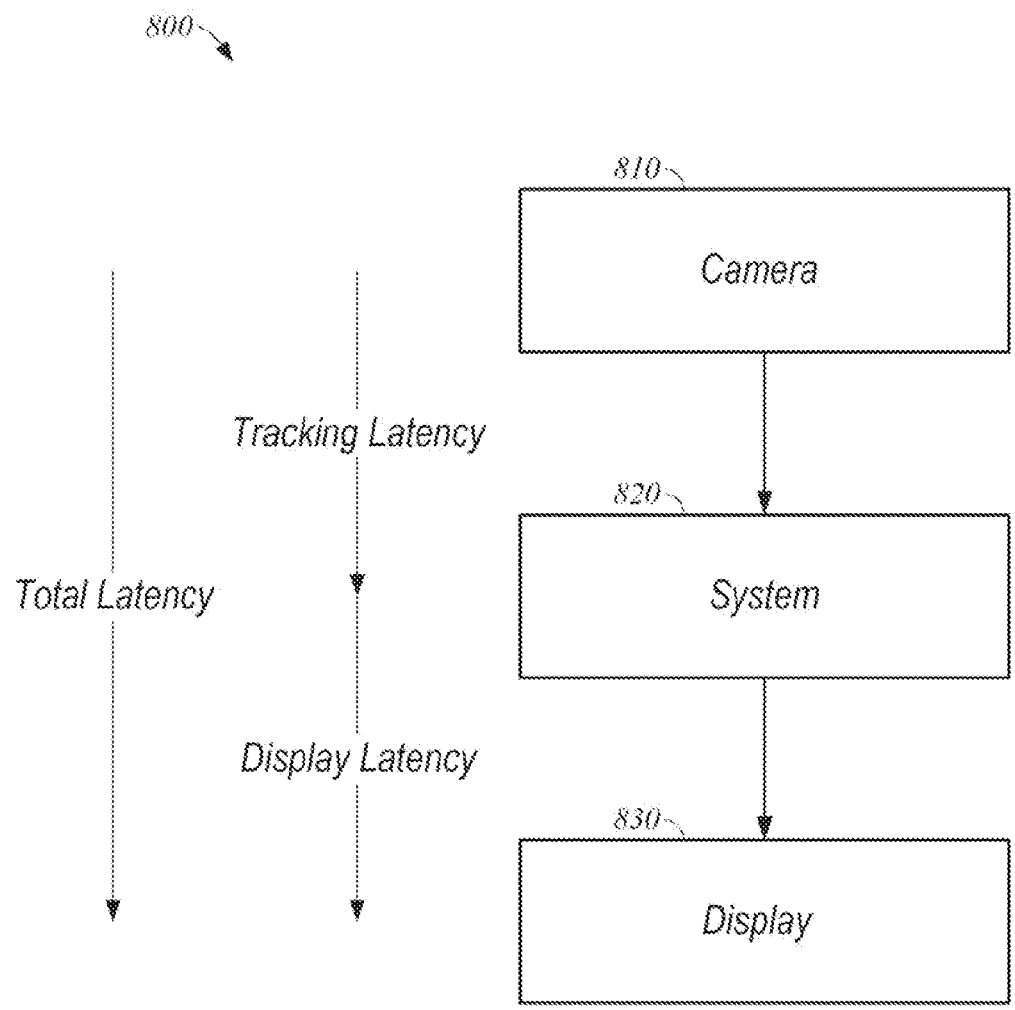
FIG. 8 illustrates a block diagram showing latency sources in a head-tracking multiview display system in an example, according to an embodiment consistent with the principles described herein.

FIG. 8 illustrates a block diagram showing latency sources in a head-tracking multiview display system 800 in an example, according to an embodiment consistent with the principles described herein. The head-tracking multiview display system 800 may include a camera 810, a system 820, and a display 830.

The camera 810, as part of the head tracker, may acquire a tracking image or a series of tracking images. The camera 810 may include an imaging sensor, which may include a rolling shutter, such that different portions of the field of view of the camera 810 may be detected at different times. The rolling shutter may impart a location-dependent component to the latency of the camera 810. The camera 810 may also include one or more location-independent source of latency, including a travel time for data to propagate from the camera 810 to the system 820, a facial detection time (e.g., the time spent determining if a face is present and where the eyes of the face are located), a render time, and others. When coupled to the system 820, the camera 810 can be synchronized to a system clock. For example, for a camera 810 having a rolling shutter, the camera 810 can be synchronized to a particular location in the camera field of view, such as a center of the field of view, a corner of the field of view, or another suitable location.

The system 820 can render an interlaced image. The system 820 can include a general processing unit. The system 820 can include a master clock, to which the camera 810 and display 830 can be synchronized.

The display 830 can show the image, such as by forming a pattern on the light valve array. The time at which the viewer sees the image (neglecting a time of propagation of the light from the light valve array to the viewer's eyes) is effectively the time at which the image is displayed. The display latency can include a travel time from the general processing unit of the system 820 to the display 830, a pixel update time, a raster time, and others. The raster time may be location-dependent (e.g., may vary from light valve to light valve on the light valve array). Other sources of latency may be location-independent (e.g., may be constant across the light valve array).

For convenience, the total latency of the system may be grouped into a (first) tracking latency and a (second) display latency.

In some embodiments, the predicted position may include a predicted position at a future time. The future time may differ from a reference time by sum of a first latency of the light valve array and a second latency of the camera.

In some embodiments, the light valve array may include a raster scan. The light valve array may have a first latency that varies across the light valve array as a function of the raster scan. The camera may include a rolling shutter. The camera may have a second latency that varies across a field of view of the camera as a function of the rolling shutter. The predicted position may include a predicted position at a location-dependent future time. The location-dependent future time may differ from a reference time by a sum of the first latency and the second latency.

Figure 9:
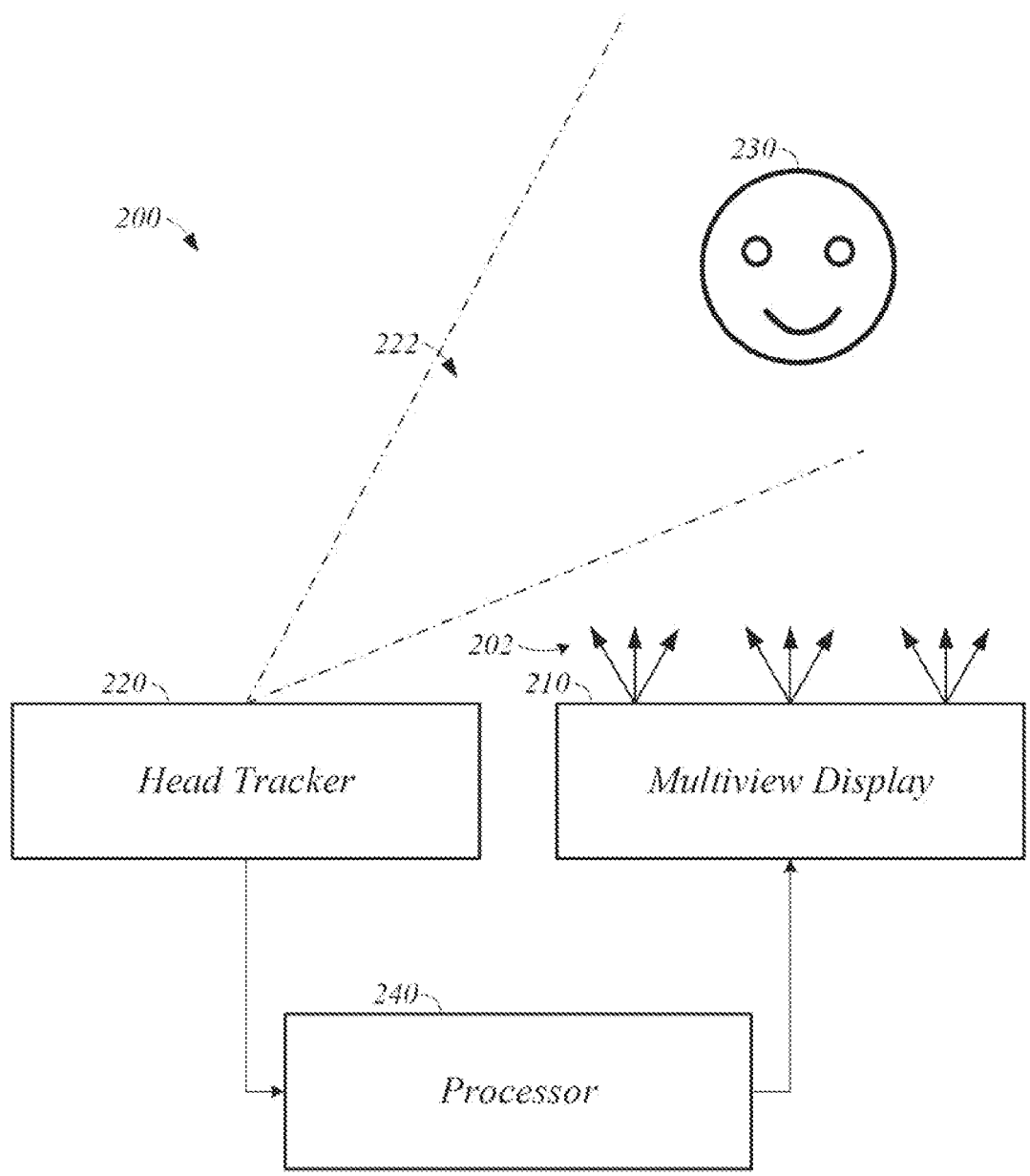
FIG. 9 illustrates a block diagram of a head-tracking multiview display system in an example, according to an embodiment consistent with the principles described herein.

FIG. 9 illustrates a block diagram of a head-tracking multiview display system 200 in an example, according to an embodiment consistent with the principles described herein. The head-tracking multiview display system 200 is configured to display a multiview image according to different views in different view directions. In particular, light beams emitted by the head-tracking multiview display system 200 are used to display a multiview image and may correspond to pixels of the different views (i.e., view pixels). The different views or equivalently different view directions are illustrated as arrows 202 emanating from the head-tracking multiview display system 200 in FIG. 9. As provided below, the arrows 202 also represent the light beams emitted by the head-tracking multiview display system 200.

The head-tracking multiview display system 200 includes a head-tracking multiview display 210. The head-tracking multiview display 210 includes a multibeam backlight configured to provide a plurality of light beams having different principal angular directions corresponding to different view directions of a multiview image. The head-tracking multiview display system 200 includes at least one processor 240 configured to receive a plurality of provisional views of the multiview image, the plurality of provisional views corresponding to the different view directions, receive information about a predicted position of a user 230, and shift the provisional views with respect to the view directions to form a plurality of shifted views that correspond to the different view directions, the shifted views being shifted by a shift value that varies as a function of the predicted position of the user 230 and varies over a field of view of the multiview image. In some examples, the various tasks can be performed by a single processor 240. In other examples, the tasks may be divided among more than one processor 240. The processor 240 can optionally be coupled to a storage device and/or memory that can store data corresponding to past measured or past tracked positions from a head tracker 220. The head-tracking multiview display 210 includes a light valve array configured to modulate light beams of the plurality of light beams to provide the plurality of shifted views of the multiview image to the view directions as the multiview image.

The head-tracking multiview display system 200 includes the head tracker 220 configured to provide the predicted position of the user 230 to the processor 240. The head tracker 220 may include a camera having a field of view 222 that includes the user 230. The camera is configured to capture an image of the user 230. The head tracker 220 may further include an image processor configured to determine a position of the user 230 within the captured image to provide the predicted position.

Figure 10:
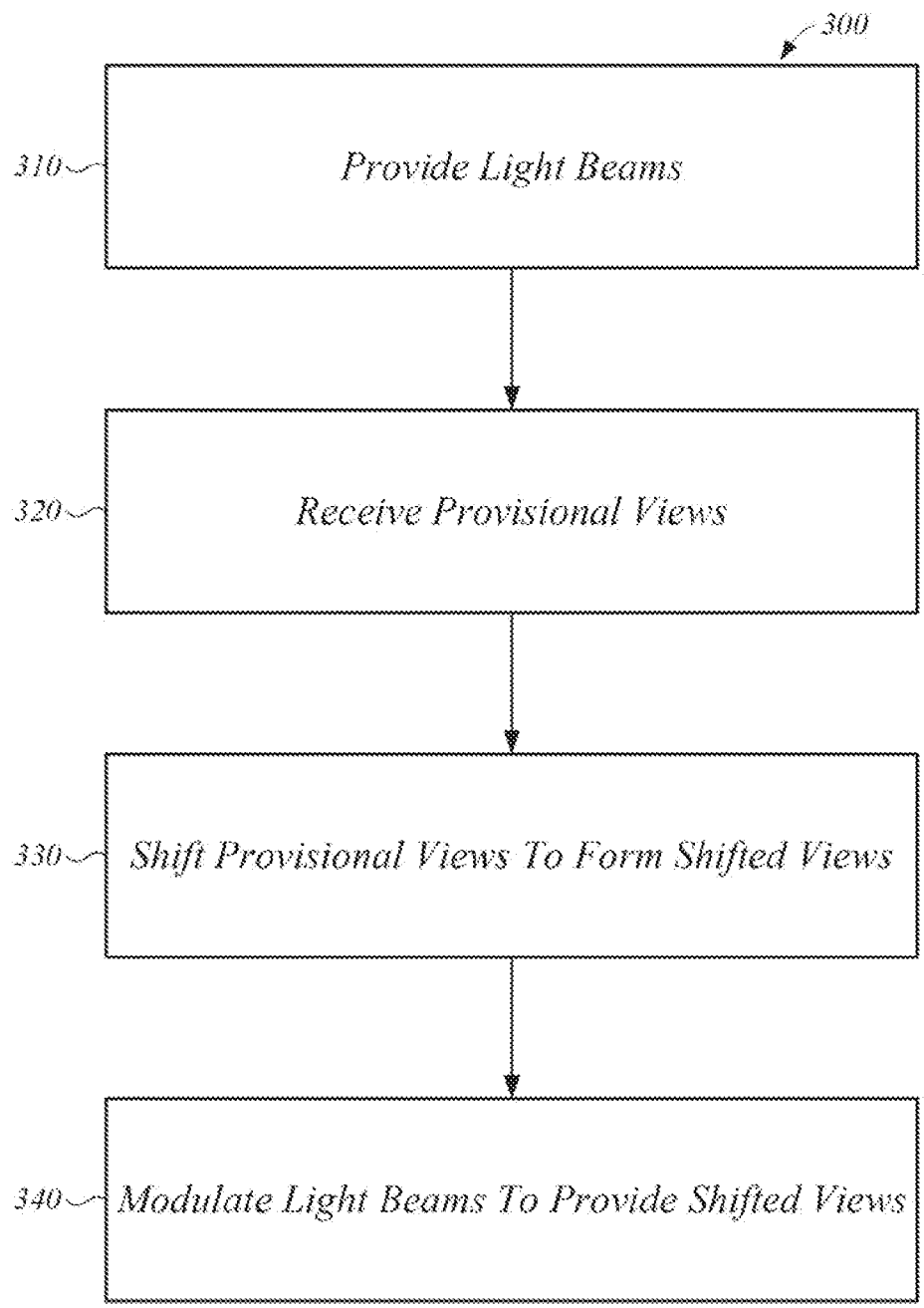
FIG. 10 illustrates a flow chart of a method of operation for a head-tracking multiview display in an example, according to an embodiment consistent with the principles described herein.

In accordance with other embodiments of the principles described herein, a method of operation for a head-tracking multiview display is provided. FIG. 10 illustrates a flow chart of a method 300 of operation for a head-tracking multiview display in an example, according to an embodiment consistent with the principles described herein.

As illustrated in FIG. 10, the method 300 of operation for a head-tracking multiview display comprises providing 310, with a multibeam backlight, a plurality of light beams having different principal angular directions corresponding to different view directions of a multiview image. The multibeam backlight may be similar in structure and function to the multibeam backlight 106.

As illustrated in FIG. 10, the method 300 of operation for a head-tracking multiview display further comprises receiving 320, with a processor, a plurality of provisional views of the multiview image. The plurality of provisional views corresponds to the different view directions. The provisional views may represent original, unmodified, or unshifted portions of a 3D image to be display to a user using the multiview display. The processor may be similar in structure and function to the processor 116.

As illustrated in FIG. 10, the method 300 of operation for a head-tracking multiview display further comprises shifting 330, with the processor, the provisional views with respect to the view directions to form a plurality of shifted views that correspond to the different view directions. The shifted views are shifted by a shift value that varies as a function of the predicted position of the user and varies over a field of view of the multiview image.

As illustrated in FIG. 10, the method 300 of operation for a head-tracking multiview display further comprises modulating 340, with a light valve array, light beams of the plurality of light beams to provide the plurality of shifted views of the multiview image to the view directions as the multiview image. The light valve array may be similar in structure and function to the light valve array 120.

In some embodiments, the method 300 of operation for a head-tracking multiview display further comprises combining, with the processor, two adjacent provisional views to form the shifted views. In some embodiments, the method 300 of operation for a head-tracking multiview display further comprises combining, with the processor, two adjacent provisional views non-linearly to form the shifted views. In some embodiments, the processor forms the shifted views by converting pixel values of the two adjacent provisional view from gamma space to linear space to form linear space pixel values, summing the linear space pixel values linearly to form a linear sum value, and converting the linear sum value from linear space to gamma space. In some embodiments, the shift value corresponds to a non-integer number of views of the multiview image. In some embodiments, such as in the peeling mode described above, the processor selects the shift value such that movement of the user allows the user to view views in a progression that matches a progression of the provisional views. In some embodiments, such as in the peeling mode described above, the processor selects the shift value such that movement of the user provides the user a sensation of parallax as the views progress.

In some embodiments, such as in the sliding mode described above, the processor selects the shift value such that the shifted views follow movement of the user and allow the user to view only a single view or a single combination of views as the user moves. In some embodiments, such as in the sliding mode described above, the processor selects the shift value to provide to the user a first three-dimensional view of the multiview image to a left eye of the user and a second three-dimensional view of the multiview image to a right eye of the user. The first and second three-dimensional views may be invariant as the user moves.

Thus, there have been described examples and embodiments of a head-tracking multiview display, a head-tracking multiview display system, and a method of operation for a head-tracking multiview display in which provisional views are shifted with respect to the view directions to form a plurality of shifted views that correspond to the different view directions, the shifted views being shifted by a shift value that varies as a function of the predicted position of the user and varies over a field of view of the multiview image. The above-described examples are merely illustrative of some of the many specific examples that represent the principles described herein. Clearly, those skilled in the art may readily devise numerous other arrangements without departing from the scope as defined by the following claims.

What is claimed is:

1. A predictive head-tracking multiview display, comprising:
   a multibeam backlight configured to provide a plurality of light beams having different principal angular directions corresponding to different view directions of a multiview image;
   a processor configured to:
     receive a plurality of provisional views of the multiview image, the plurality of provisional views corresponding to the different view directions;
     receive information about a predicted position of a user, the information about the predicted position based on a plurality of measured positions of the user; and
     shift the provisional views with respect to the view directions to form a plurality of shifted views that correspond to the different view directions, the shifted views being shifted by a shift value that varies as a function of the predicted position of the user and varies over a field of view of the multiview image; and
   a light valve array configured to modulate light beams of the plurality of light beams to provide the plurality of shifted views of the multiview image to the view directions as the multiview image, the light valve array including a raster scan, the light valve array having a latency that varies across the light valve array as a function of the raster scan, the predicted position comprising a predicted position at a location-dependent future time, the location-dependent future time differing from a reference time by the latency of the light valve array.

2. The predictive head-tracking multiview display of claim 1, wherein: the predicted position comprises a predicted position at a future time; and the future time differs from a reference time by a latency of the light valve array.

3. The predictive head-tracking multiview display of claim 1, wherein the processor is further configured to determine the predicted position of the user based on a plurality of past measured positions of the user.

4. The predictive head-tracking multiview display of claim 3, further comprising a head tracker configured to provide the plurality of past measured positions of the user, the head tracker comprising a camera configured to capture sequential images of the user, the head tracker further comprising an image processor configured to determine a position of the user within each captured image to provide the plurality of past measured positions.

5. The predictive head-tracking multiview display of claim 4, wherein the processor is further configured to: calculate a velocity of the user from at least two past measured positions of the plurality of past measured positions; and determine the predicted position of the user based on the velocity of the user and a most recent measured position of the plurality of past measured positions.

6. The predictive head-tracking multiview display of claim 4, wherein the processor is further configured to: calculate a velocity of the user from at least two past measured positions of the plurality of past measured positions; calculate an acceleration of the user from at least three past measured positions of the plurality of past measured positions; and determine the predicted position of the user based on the acceleration of the user, the velocity of the user, and a most recent past measured position of the plurality of past measured positions.

7. The predictive head-tracking multiview display of claim 1, wherein the processor is further configured to shift the provisional views with respect to the view directions to form the shifted views by combining two adjacent provisional views.

8. The predictive head-tracking multiview display of claim 7, wherein the processor is further configured to form the shifted views by non-linearly combining the two adjacent provisional views.

9. The predictive head-tracking multiview display of claim 8, wherein the processor is further configured to form the shifted views by: converting pixel values of the two adjacent provisional view from gamma space to linear space to form linear space pixel values; summing the linear space pixel values linearly to form a linear sum value; and converting the linear sum value from linear space to gamma space.

10. The predictive head-tracking multiview display of claim 1, wherein the shift value corresponds to a non-integer number of views of the multiview image.

11. The predictive head-tracking multiview display of claim 1, wherein: the shift value is selected such that movement of the user allows the user to view views in a progression that matches a progression of the provisional views; and the shift value is selected such that movement of the user provides the user a sensation of parallax as the views progress.

12. The predictive head-tracking multiview display of claim 1, wherein: the shift value is selected such that the shifted views follow movement of the user and allow the user to view only a single view or a single combination of views as the user moves; and the shift value is selected to provide to the user a first three-dimensional view of the multiview image to a left eye of the user and a second three-dimensional view of the multiview image to a right eye of the user, the first and second three-dimensional views being invariant as the user moves.

13. A method of operation for a predictive head-tracking multiview display, the method comprising: providing, with a multibeam backlight, a plurality of light beams having different principal angular directions corresponding to different view directions of a multiview image; receiving, with a processor, a plurality of provisional views of the multiview image, the plurality of provisional views corresponding to the different view directions; receiving, with the processor, information about a predicted position of a user, the information about the predicted position based on a plurality of measured positions of the user; shifting, with the processor, the provisional views with respect to the view directions to form a plurality of shifted views that correspond to the different view directions, the shifted views being shifted by a shift value that varies as a function of the predicted position of the user and varies over a field of view of the multiview image; and modulating, with a light valve array, light beams of the plurality of light beams to provide the plurality of shifted views of the multiview image to the view directions as the multiview image; determining the predicted position based on a plurality of past measured positions of the user; capturing sequential images of the user using a head tracker that includes a camera; and determining a position of the user within each captured image to provide the plurality of past measured positions, the light valve array including a raster scan, the light valve array having a first latency that varies across the light valve array as a function of the raster scan, the camera including a rolling shutter, the camera having a second latency that varies across a field of view of the camera as a function of the rolling shutter, the predicted position comprising a predicted position at a location-dependent future time, the location-dependent future time differs from a reference time by a sum of the first latency and the second latency.

14. The method of claim 13, further comprising: calculating a velocity of the user from at least two past measured positions of the plurality of past measured positions; and determining the predicted position of the user based on the velocity of the user and a most recent measured position of the plurality of past measured positions.

15. The method of claim 13, further comprising: calculating a velocity of the user from at least two past measured positions of the plurality of past measured positions; calculating an acceleration of the user from at least three past measured positions of the plurality of past measured positions; and determining the predicted position of the user based on the acceleration of the user, the velocity of the user, and a most recent past measured position of the plurality of past measured positions.

16. The method of claim 13, further comprising: shifting the provisional views with respect to the view directions to form the shifted views by non-linearly combining two adjacent provisional views, wherein the provisional views are formed by: converting pixel values of the two adjacent provisional view from gamma space to linear space to form linear space pixel values; summing the linear space pixel values linearly to form a linear sum value; and converting the linear sum value from linear space to gamma space.

17. The method of claim 13, wherein the shift value corresponds to a non-integer number of views of the multiview image.

18. The method of claim 13, wherein: the shift value is selected such that movement of the user allows the user to view views in a progression that matches a progression of the provisional views; and the shift value is selected such that movement of the user provides the user a sensation of parallax as the views progress.

19. The method of claim 13, wherein: the shift value is selected such that the shifted views follow movement of the user and allow the user to view only a single view or a single combination of views as the user moves; and the shift value is selected to provide to the user a first three-dimensional view of the multiview image to a left eye of the user and a second three-dimensional view of the multiview image to a right eye of the user, the first and second three-dimensional views being invariant as the user moves.

20. A predictive head-tracking multiview display, comprising:
    a head tracker including a camera configured to capture sequential images of a user, the head tracker further including an image processor configured to determine a position of the user within each captured image to provide a plurality of past measured positions of the user;
    a multibeam backlight configured to provide a plurality of light beams having different principal angular directions corresponding to different view directions of a multiview image;
    a processor configured to:
        determine a predicted position of the user based on the plurality of past measured positions of the user;

receive a plurality of provisional views of the multiview image, the plurality of provisional views corresponding to the different view directions; and shift the provisional views with respect to the view directions to form a plurality of shifted views that correspond to the different view directions, the shifted views being shifted by a shift value that varies as a function of the predicted position of the user and varies over a field of view of the multiview image; and a light valve array configured to modulate light beams of the plurality of light beams to provide the plurality of shifted views of the multiview image to the view directions as the multiview image, the light valve array including a raster scan, the light valve array having a latency that varies across the light valve array as a function of the raster scan, the predicted position comprising a predicted position at a location-dependent future time, the location-dependent future time differing from a reference time by the latency of the light valve array.

\* \* \* \* \*